United States Patent [19]

Lock

[11] Patent Number: 5,460,638
[45] Date of Patent: Oct. 24, 1995

[54] METHOD FOR VACUUM FORMING DISHES FROM A RIBBON

[75] Inventor: William E. Lock, Horseheads, N.Y.

[73] Assignee: Corning Incorporated, Corning, N.Y.

[21] Appl. No.: 129,757

[22] Filed: Sep. 30, 1993

[51] Int. Cl.[6] .................................................. C03B 13/01
[52] U.S. Cl. ................................ 65/67; 65/101; 65/177;
65/97; 65/70; 65/71
[58] Field of Search .................................. 65/67, 97, 166,
65/177, 101, 145, 184, 263, 356, 70, 81

[56] References Cited

U.S. PATENT DOCUMENTS

| | | | |
|---|---|---|---|
| 1,178,257 | 4/1916 | Haley | 65/97 |
| 1,766,680 | 6/1930 | Parham | 65/184 |
| 1,863,915 | 6/1932 | Waugh | 65/184 |
| 1,896,870 | 2/1933 | Smith | 65/184 |
| 2,286,323 | 6/1942 | Weber et al. | 65/184 |
| 3,231,356 | 1/1966 | Giffen . | |
| 3,528,791 | 9/1970 | Giffen | 65/67 |
| 3,552,941 | 1/1971 | Giffen | 65/177 |
| 3,582,454 | 6/1971 | Giffen | 65/177 |
| 4,361,429 | 11/1982 | Anderson | 65/67 |
| 4,605,429 | 8/1986 | Rajnik | 65/97 |

*Primary Examiner*—Steve Alvo
*Assistant Examiner*—John Hoffmann
*Attorney, Agent, or Firm*—Robert L. Carlson

[57] ABSTRACT

A method and apparatus for producing a glass ware, such as a bowl or plate, via vacuum forming. A deformable glass ribbon is passed through a pair of parallel rolls or rollers, one of the rollers having a recessed cavity thereon for forming a thicker product zone and a thinner cullet zone on the glass ribbon. The product zone may be specifically configured to compensate for process stretching of the glass ribbon during the vacuum forming process. The product zone is registered over a vacuum mold, and a vacuum is applied to the mold to thereby deform the glass to a concave shape and thus form the dish. The dish is separated from the glass ribbon by trimming at the periphery of the dish.

1 Claim, 4 Drawing Sheets

METHOD FOR VACUUM FORMING DISHES FROM A RIBBON

BACKGROUND OF THE INVENTION

The present invention relates to a method and apparatus for making glassware, such as dishes or plates, and more particularly to a method and apparatus for producing such glassware via vacuum forming. Glass plates and dishes are commonly vacuum formed in processes wherein a ribbon of glass, either of a single ply or of a laminate construction, is fed in a continuous sheet to a rotating turret, the periphery of which is provided with a plurality of vacuum mold cavities. A pair of rollers receives the deformable glass ribbon and directs it to the turret, registering the ribbon with the vacuum molds. The vacuum molds are activated to draw the glass into the molds, thereby forming the glass ribbon to the shape of the mold. A trimming mechanism then cuts through the glass ribbon to define the periphery of the plate. After trimming, each plate is then discharged from the turret. Such a method and apparatus is disclosed, for example, in U.S. Pat. No. 3,231,356 to Giffen.

While this method has generally proven to be satisfactory for the production of glass plates, it would be desirable to develop methods for increasing the yield of such devices. In addition, it would be desirable to develop methods which produced less cullet.

Recessed rollers have heretofore been utilized in glass blowing operations, such as those used to make light bulbs. Examples of such processes are disclosed in U.S. Pat. Nos. 3,598,560 and 1,807,566. However, such rollers have never before been used successfully in turret-type vacuum molding processes.

SUMMARY OF THE INVENTION

One aspect of the present invention relates to an apparatus for vacuum forming glassware, particularly plates and other dinner wares, comprising:

a turret rotatable about an axis, said turret having a plurality of vacuum mold cavities thereon, a pair of rollers for delivering a deformable ribbon of glass to and in registry with the vacuum mold cavities, at least one of said rollers having a recessed cavity thereon for forming a thicker product zone and a thinner cullet zone on the sheet. The selectively thicker product zone is then registered with a vacuum mold on the turret.

Another aspect of the present invention relates to a method of making a generally concave glassware product shape comprising:

passing a deformable ribbon of glass through a pair of rotating rollers, one of the rollers having a recessed surface thereon to form a thicker product zone and a thinner cullet zone on said ribbon;

placing the thickened product zone of the glass ribbon in registry with a vacuum mold cavity;

deforming the product zone by applying a vacuum to the mold cavity; and trimming glass from around the sculptured portion of the glass to thereby separate the ware from the ribbon.

Another aspect of the present invention relates to an apparatus for forming glass ware comprising:

a pair of rollers for delivering a deformable ribbon of glass ribbon to and in registry with at least one vacuum mold cavity, at least one of said rollers having a recessed cavity thereon for forming a thicker product zone and a thinner cullet zone, said cavity having a contoured shape to make selective portions of said product zone thicker than other portions of said product zone. The thicker product zone is then registered over a vacuum mold. When the vacuum is applied to deform the glass product zone into a finished glassware, the material in the thicker portion of the product zone is deformed more than material from the thinner portion of the product zone, thereby making the glass thickness in the product zone more uniform than prior to forming. In this way, the product zone may be specifically configured to compensate for non-uniform process stretching of the glass ribbon during the vacuum forming process.

The methods and apparatus of the present invention result in a variety of advantages. For example, recessed rolls can be utilized to form uniform or non-uniform thickness product zones which are thicker than the surrounding cullet zone of the glass ribbon. Thicker product zones, either uniform or non-uniform, can be used to increase the yield of conventional vacuum forming process, or to decrease the amount of cullet produced by such processes.

Alternatively, the recess can be tailored to form non-uniform product zones, that is, product zones having more deformable material where it is needed. In this way, products can be produced which were heretofore difficult or impossible to form using vacuum forming processes. For example, deeply recessed bowls can be made with more uniform thickness by contouring the recess to provide more material in the areas of the product zone which undergo substantial stretching, such as the walls and corners of the base of the bowl. Such contoured product zones will thus have areas of varying thickness. The thicker areas will stretch more, during the vacuum forming process, than the thinner areas, so that the end result is a product having relatively uniform wall thickness.

It has been found that such rollers having a uniformly or non-uniformly recessed cavity can be utilized in ribbon and turret type vacuum forming processes, as long as the depth of the recess is limited so that a sufficient cullet thickness is left on the periphery of the ribbon to allow the cullet to remove itself, via gravity, after the forming and trimming operations.

DESCRIPTION OF THE DRAWINGS

FIG. 1b is an enlarged view of the raised decorative design 38a produced by a recessed cavity 36a illustrated in FIG. 1a.

DETAILED DESCRIPTION OF THE INVENTION

Figure 1:
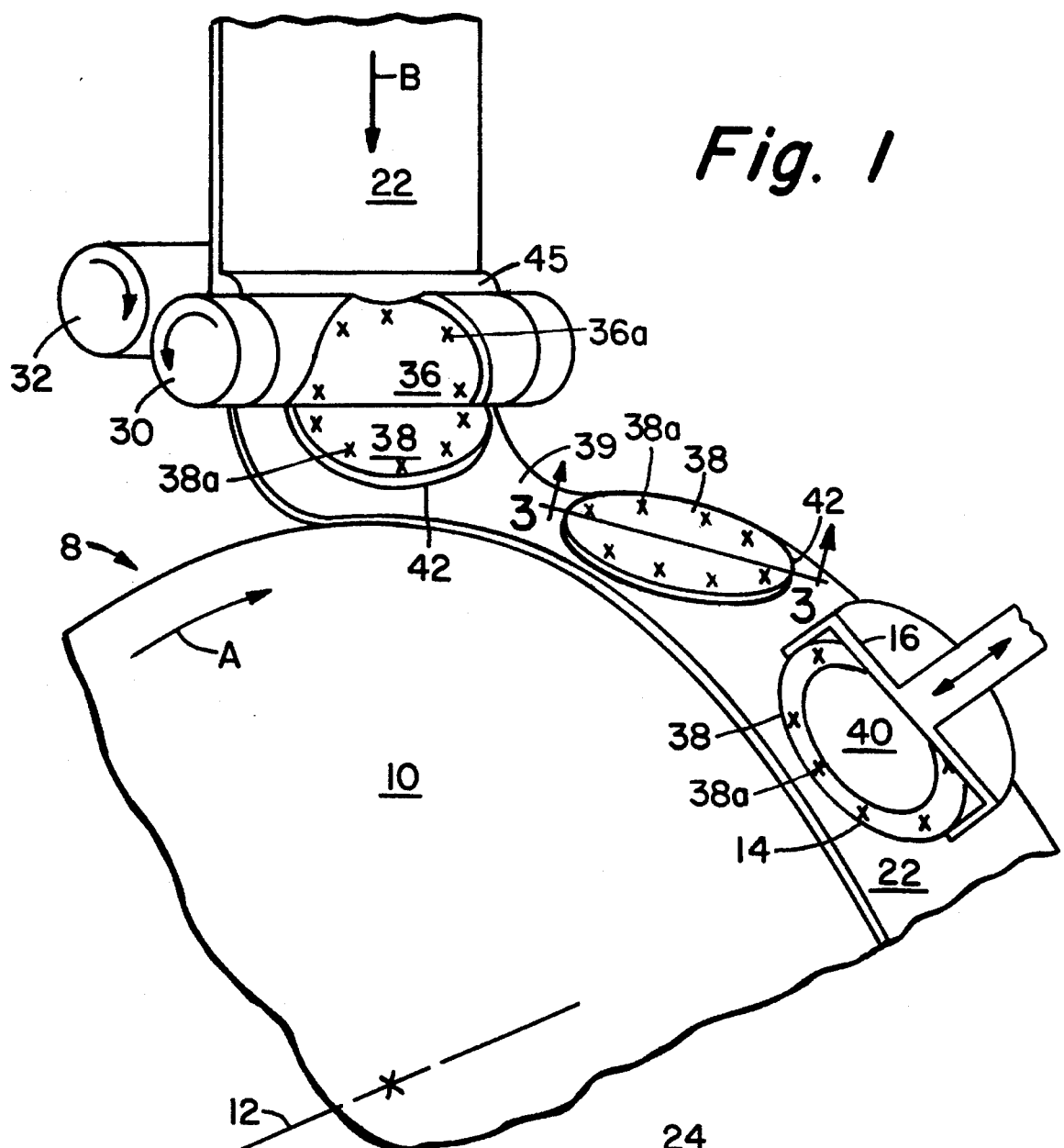
FIG. 1 is a partial perspective view of an apparatus and method in accordance with the present invention.

Referring now to FIG. 1 of the drawings, the numeral 8 denotes generally a portion of an apparatus for practicing the present invention, the apparatus being similar to that shown in U.S. Pat. No. 3,231,356 to Giffen, which is hereby incorporated by reference. A rotatable turret 10 is continuously rotated about a horizontal axis 12 in the direction indicated by the curved arrow A. A plurality of vacuum molds 14 are evenly spaced around the periphery, or rim, of turret 10. A reciprocating trimmer 16 sequentially cuts finished, vacuum formed dishes from the glass ribbon. The trimming element 16 functions similar to a common cookie cutter. The exact form of trimmer 16 is not important for carrying out the invention, and alternatively other methods could be employed.

A deformable ribbon of glass 22 is passed downwardly in the direction indicated by arrow B between water cooled roller elements 30 and 32, which shape the deformable ribbon and deliver it to turret 10. A recessed cavity 36 is provided on the outer peripheral surface of roller element 30.

Consequently, as deformable glass ribbon 22 passes in the indicated direction through the nip (the nip is the location where the distance between the two rollers is the smallest) of rollers 30 and 32, the surface contacting roller 30 (radially outermost on the turret 10 in FIG. 1) will be provided with a thickened product zone 38 having a periphery 42, and a thinner cullet zone 39. The glass ribbon 22, which now includes a product zone 38 and cullet zone 39, is then directed onto the turret 10. Turret 10 and recessed roller 30 cooperatively interact so that, when glass ribbon 22 is deposited onto turret 10, the product zones 38 formed by recessed roller 30 are in registry with the vacuum mold cavities 14. A vacuum is applied to the ribbon through the vacuum mold, with the product zone 38 preferably facing in a direction away from the source of vacuum (although product zone 38 could alternatively be facing the vacuum source). The applied vacuum deforms the product zone 38 to the shape of the mold 14, typically a substantially concave shape. The actuation of trimmer apparatus 16 effects definition and separation of each plate 40 from the ribbon 22. It is preferred to trim plate 40 either during or after the vacuum forming operation, to minimize plate edge deformation.

The exact construction of turret 10 and the vacuum sources associated with each vacuum cavity or mold 14 are known to workers in this art, such as may be seen by reference to the noted Giffen-356 patent, and hence need not be described for a complete understanding of the present invention.

Figure 2:
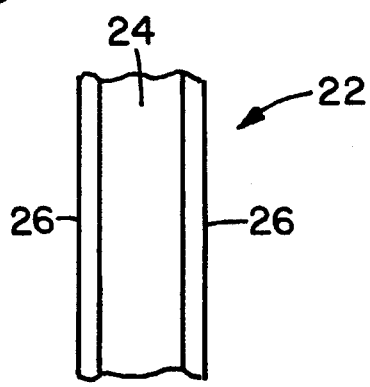
FIG. 2 is a cross-sectional view illustrating the laminated nature of the glass ribbon shown in FIG. 1.

Referring to FIG. 2 of the drawings, a typical laminate construction for producing glass ware according to the present invention is illustrated. An inner core 24 of typically 0.110 to 0.140 inches thickness is sandwiched by layers 26, typically of 0.002 to 0.003 inches in thickness. In a preferred embodiment of the present invention, the glass ribbon has a thickness, prior to contacting the rolls, which is 10 to 15 percent thicker than the desired product zone 36. After contact and shaping by the rolls 30 and 32, the product zone 38 produced on ribbon 22 is typically about 0.110 to 0.140 inches in thickness, while the remainder or cullet portion of the ribbon is typically about 0.030 to 0.050 inches thinner than the product zone.

It will be noted that where the ribbon passes through the nip of rollers 30 and 32, a stationary molten glass puddle 45 is preferably maintained between the two rollers 30 and 32. Puddle 45 may be formed by feeding a surplus of glass to the rollers 30 and 32. Once the puddle has been built up, the flow of glass to the rollers is maintained at an amount which is sufficient to maintain the puddle at the desired. The size of the puddle is not critical to the method of the invention. However, it is preferred that the puddle be larger than the depth of recess 36. Deformation of the ribbon and filling of the recess is effected during contact of the puddle and ribbon with the nip of the rollers 30 and 32. The puddle temperature remains relatively high prior to contact with the roller, thereby ensuring that the glass ribbon is formed at an optimum temperature. To increase the mechanical stability of the puddle, glass ribbon 22 is preferably directed onto roll 32, rather than directly in between the two rolls 30 and 32. Consequently, recess 36 will contact puddle 45 prior to contacting ribbon 22.

Figure 3:
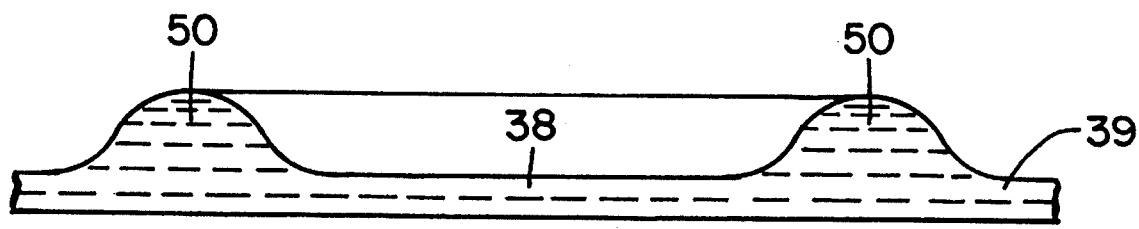
FIG. 3 is a conceptual cross-sectional view of a selectively thickened product zone taken along line 3—3 of FIG. 1.
Figure 4:
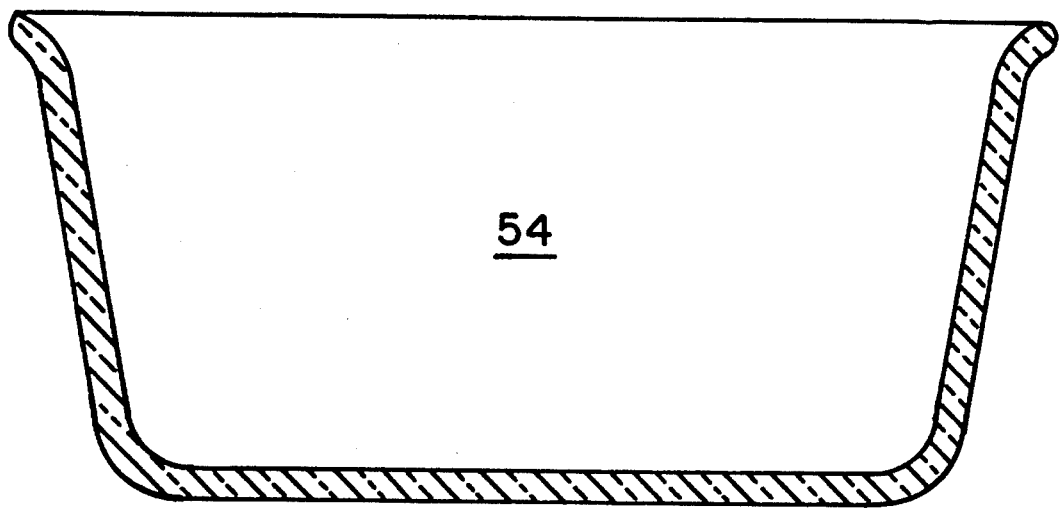
FIG. 4 is a cross-sectional view of the product zone illustrated in FIG. 3, after being vacuum formed into a bowl-shaped object.
Figure 3A:
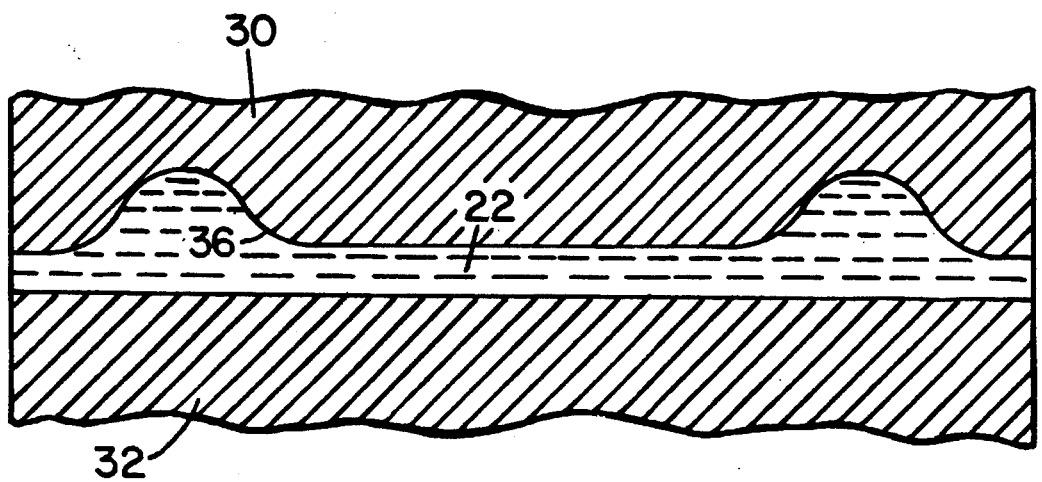
FIG. 3a illustrates the formation of the selectivity thickened product zone illustrated in FIG. 3.

The recessed cavity 36 may have a uniform recess depth, so that it result in a uniform thickness product zone 38 as illustrated in FIG. 1. Alternately, recessed cavity 36 may be configured to impart selectively thicker or thinner regions within the product zone 38 itself, as best illustrated in FIGS. 3 and 3a. FIGS. 3 and 4 illustrate a cross-section of the glass ribbon, prior to and after vacuum forming, respectively, in which a selectively thickened product zone is used to vacuum-form a bowl. FIG. 3a illustrates the formation of the selectivity thickened product zone between rollers 30 and 32. Such selectively thicker regions may be provided, for example, to compensate for process stretching of the glass ribbon during the vacuum forming process. Thus, as illustrated in FIG. 3, selectively thickened regions 50 may be provided on product zone 38 of the glass ribbon, so that during vacuum forming, the thicker zones 50 will deform and redistribute to a greater degree than the remainder of the product zone 38. As illustrated in FIG. 4, the selectively thickened regions 50 of product zone 38 are redistributed, during the vacuum forming process, into the deep wall of bowl 54. This enables the formation of deep, bowl shaped concave objects, such as is illustrated in FIG. 4, which were heretofore difficult or impossible to make using vacuum forming processes. In this way, the originally nonuniform cross-sectional thickness of the product zone 38 will be made more uniform.

Figure 1A:
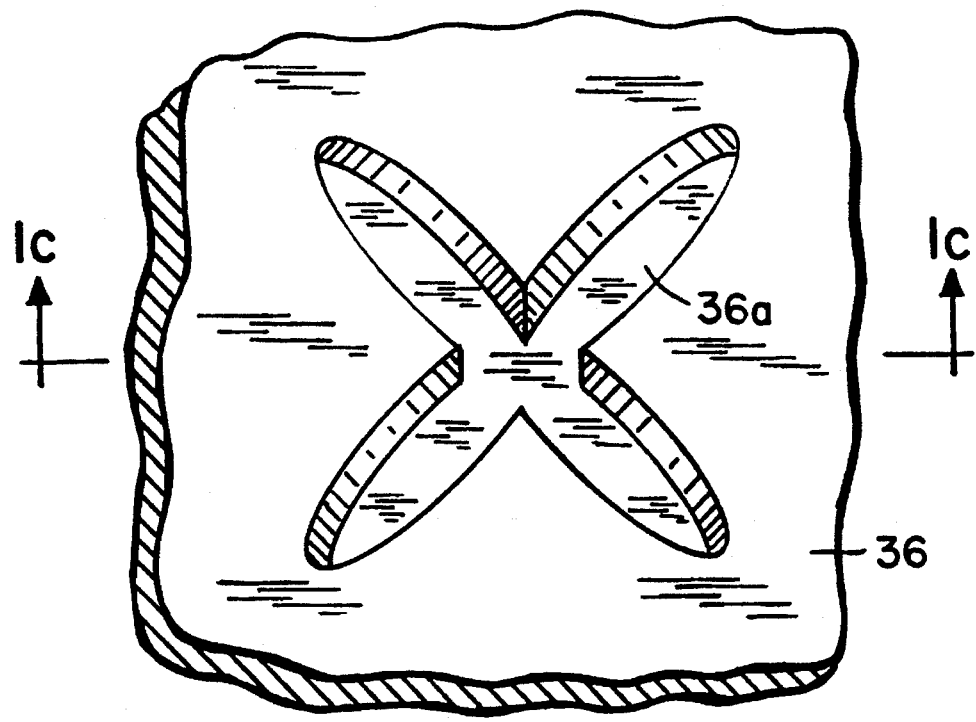
FIG. 1a is an enlarged view of the decorative design recessed cavities 36a illustrated in FIG. 1.
Figure 1B:
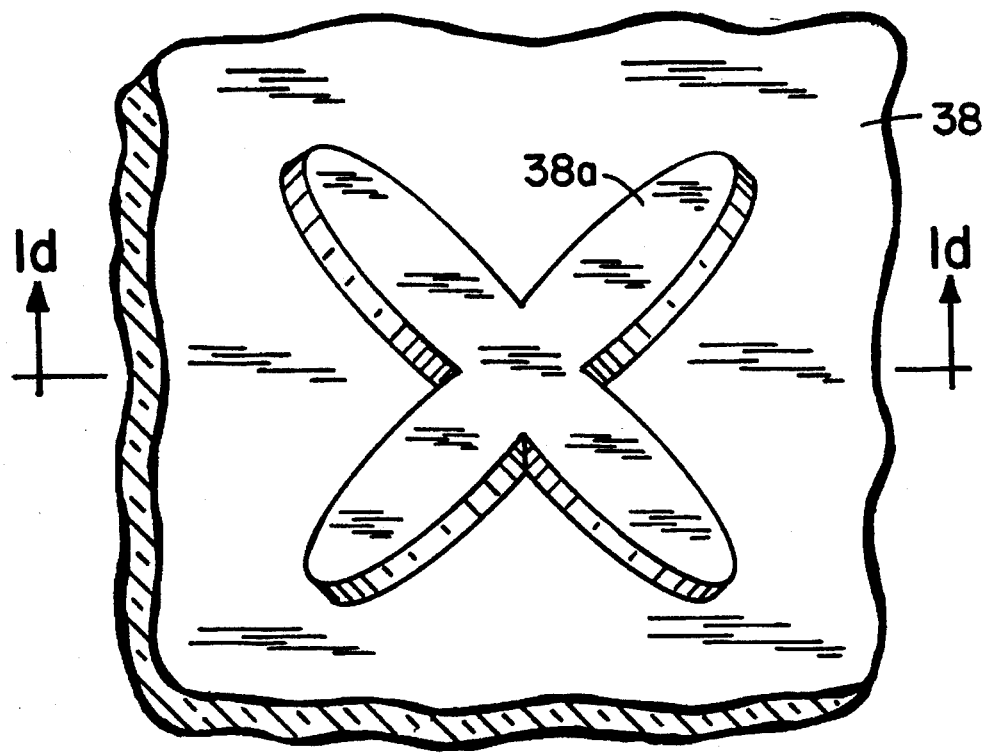
Figure 1C:
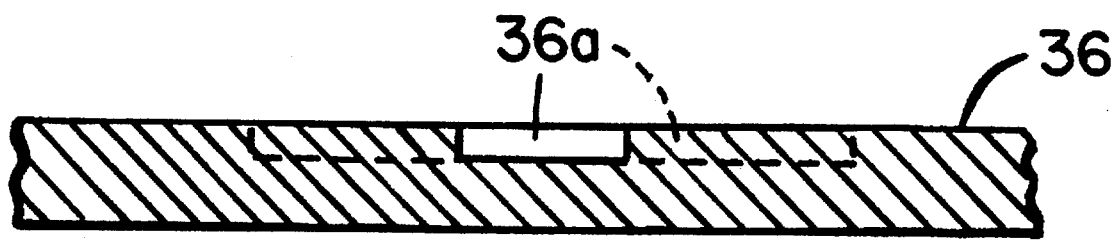
FIG. 1c is a cross-sectional view of the recessed cavity 36a illustrated in FIG. 1a, taken across line 1c–1c.
Figure 1D:
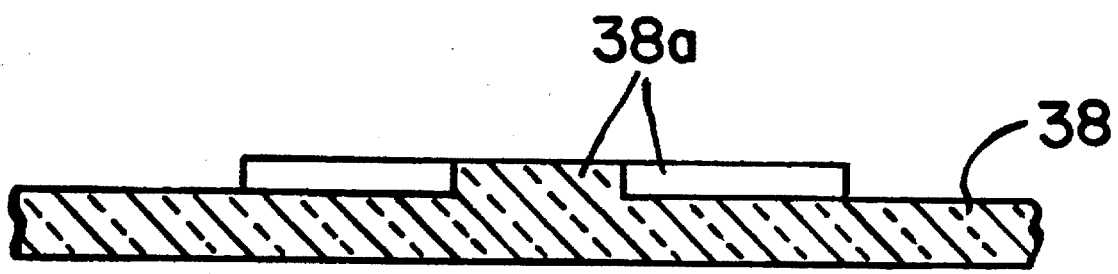
FIG. 1d is a cross-sectional view of the raised decorative design 38a illustrated in FIG. 1b, taken across line 1d–1d.

In addition, recessed cavity 36 may be provided with decorative design recessed cavities 36a, so that the concave surface of the finished plate is in turn provided with these designs 38 a. FIG. 1a is an enlarged view of the decorative design recessed cavities 36a illustrated in FIG. 1. FIG. 1b is an enlarged view of the raised decorative design 38a produced by the recessed cavity 36a illustrated in FIG. 1a. FIG. 1c is a cross-sectional view of the recessed cavity 36a illustrated in FIG. 1a, taken across line 1c–1c. FIG. 1d is a cross-sectional view of the raised decorative design 38a illustrated in FIG. 1b, taken across line 1d–1d.

Preferably, the rollers are separated a sufficient distance, and the depth of the cavity 36 tailored to result in a cullet portion 39 on the ribbon which is sufficiently thick that the ribbon, via gravity, removes itself from the rotating turret. This nip distance and recess depth can vary greatly depending on the process speed, materials used, and so forth. In experiments, recess depths between about 0.030 to 0.050 inches were successfully used to produce a product zone of between 0.110 to 0.140 inches, and a cullet zone of 0.070 to 0.090 inches. Car should be taken not to thin the cullet portion too much, since in such cases, the cullet may stick to the turret while it rotates, resulting in disruption of subsequent forming operations. Consequently, in most instances, the rollers of the present invention, the nip distance, or the distance between the non-recessed portions of roller 30 and roller 32, should be maintained at least at a distance of about 0.050 inches, and more preferably at least 0.070 inches.

In one specific example of the invention, glass ribbon 22 was formed of laminated glass of the type shown in, for example, U.S. Pat. Nos. 3,673,049 and 3,849,097. The linear speed of ribbon 22 was about 35 ft./min. and the ribbon thickness in the uniform thickness product zone 38 was about 0.120 inches. The cullet portion of the ribbon, after forming of the product zone, was about 0.090 inches. The width of the ribbon was 14 inches and the diameter of plates 38 were approximately 10.25 inches. The dwell time between leaving the nip of rollers 30 and 32, and vacuum deforming was about 3 to 4 seconds, while the ribbon surface temperature dropped from about 1280° C. above the rollers (prior to contacting the rollers) to about 1000° C. dust prior to vacuum deformation and trimming. The surface temperature of rollers 30 and 32 measured at a location 180 degrees from the nip, was 620° C. for roller 30 and 580° C. for roller 32. The rollers were cooled by water circulated at approximately 15 gallons/min (each roller). The rollers were of a conventional construction being made of 420 stainless steel. The nip distance was approximately 0.12 inches.

Although the invention has been described in detail for the purpose of illustration, it is understood that such detail is solely for that purpose and variations can be made therein by those skilled in the art without departing from the spirit and scope of the invention.

What is claimed is:

1. A method of making a glass product comprising:

deforming a ribbon of glass by passing said ribbon through a pair of rotating rollers, one of the rollers having at least one recess of non-uniform depth on the surface thereof, said recess of non-uniform depth comprising at least one decorative design cavity therein, thereby forming a product zone of non-uniform thickness from which a glass product will be molded and a cullet zone which is thinner than said product zone on said ribbon of glass, said product zone having at least one decorative pattern thereon from said at least one decorative design cavity;

placing the product zone in registry with a vacuum mold cavity;

applying a vacuum to the mold cavity to deform the product zone into the glass product; and trimming the glass from around the mold cavity to separate the glass product from the cullet zone of the ribbon, whereby the glass product has said decorative pattern thereon.

* * * * *